April 13, 1937.  L. F. NENNINGER  2,076,859

TRANSMISSION AND CONTROL MECHANISM

Filed May 31, 1935  3 Sheets-Sheet 1

INVENTOR.
LESTER F. NENNINGER
BY
A. H. K. Parsons
ATTORNEY.

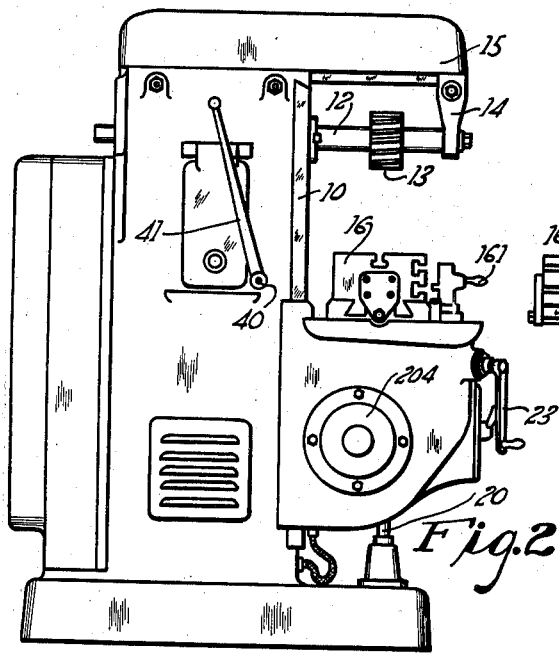
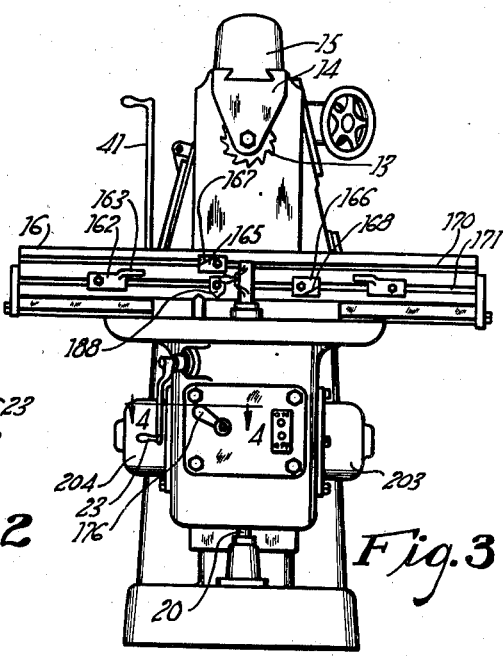
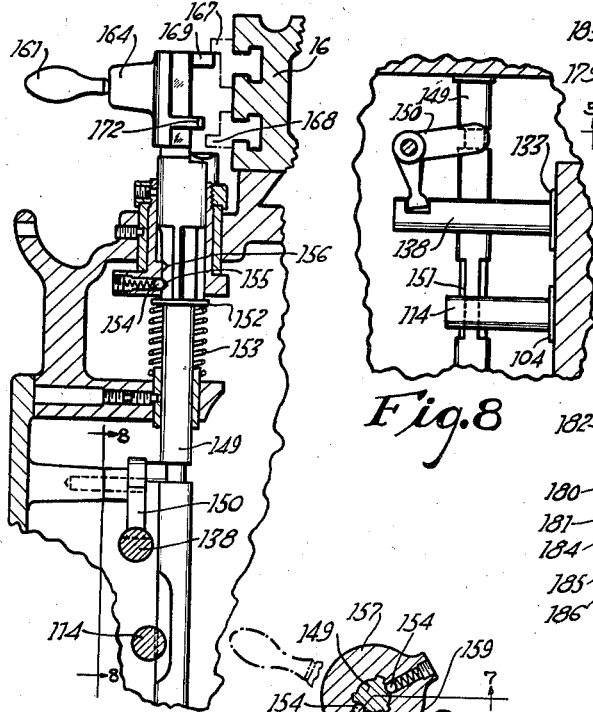
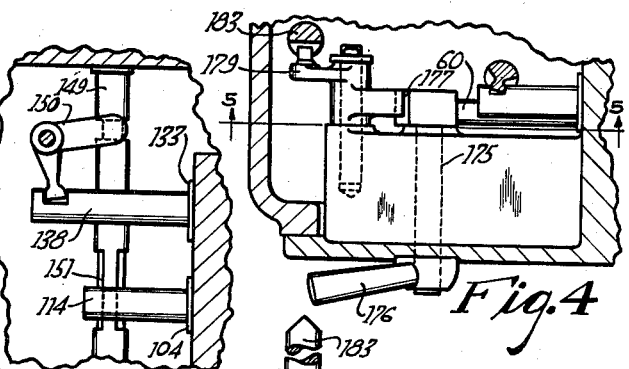
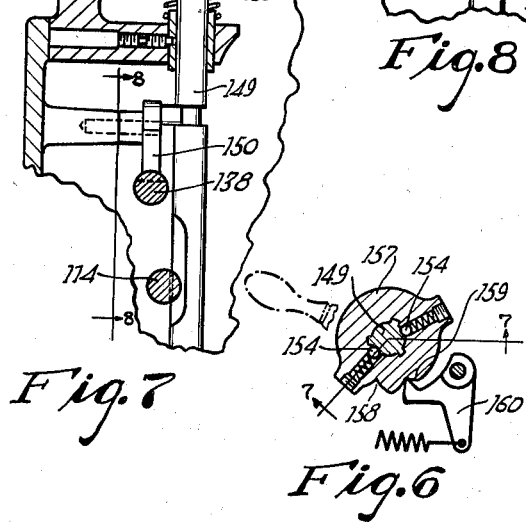
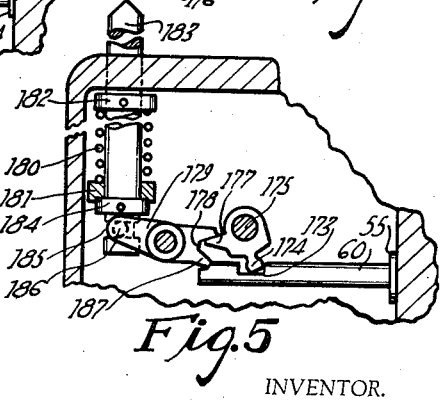

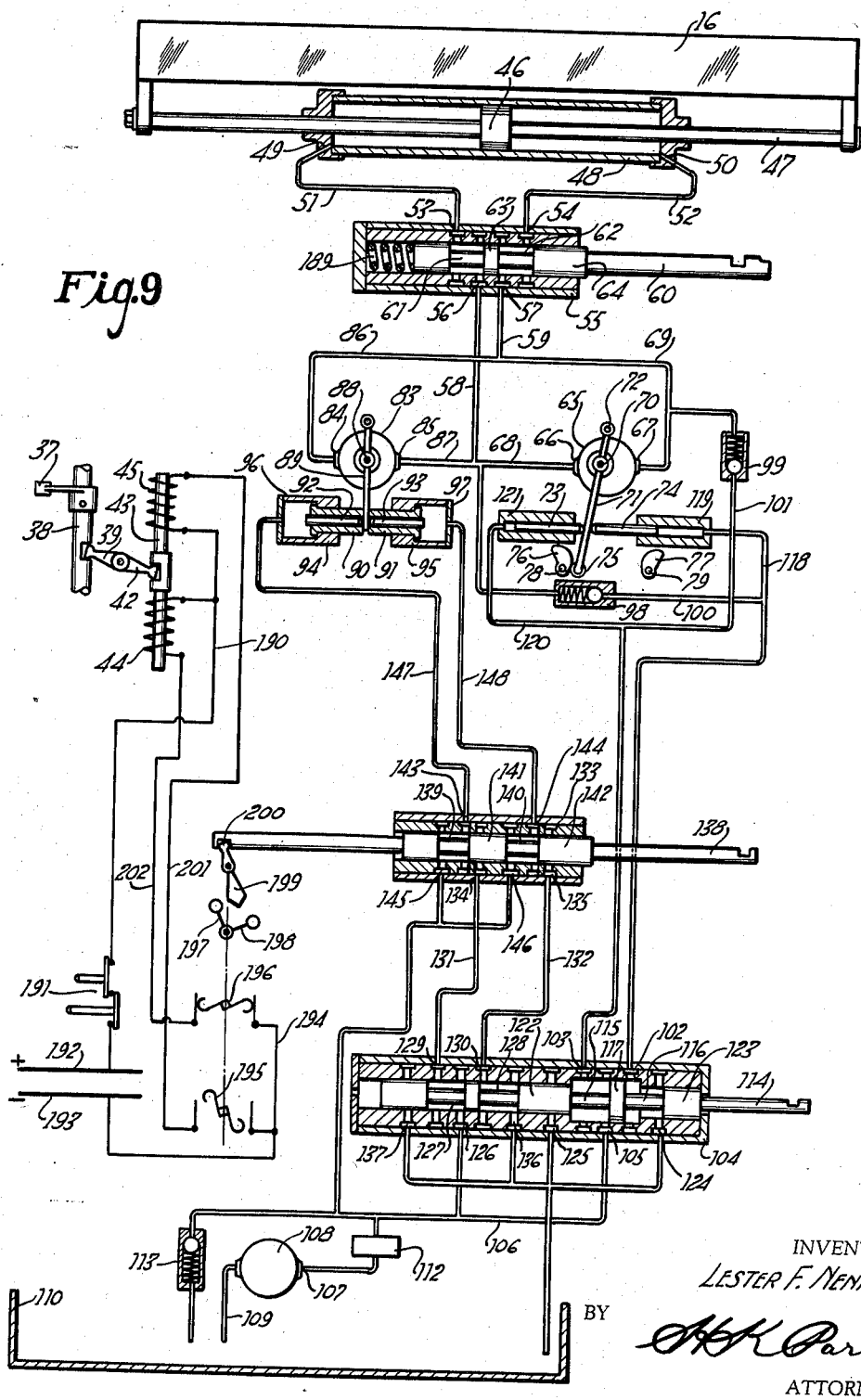

Patented Apr. 13, 1937

2,076,859

UNITED STATES PATENT OFFICE 2,076,859

TRANSMISSION AND CONTROL MECHANISM

Lester F. Nenninger, Cincinnati, Ohio, assignor to The Cincinnati Milling Machine Co., Cincinnati, Ohio, a corporation of Ohio Application May 31, 1935, Serial No. 24,223

19 Claims. (Cl. 90—21.5)

This invention relates to milling machines and more particularly to improvements in the transmission and control mechanism thereof.

One of the objects of this invention is to provide a simple form of hydraulic transmission for a milling machine, which is composed of a minimum number of parts and yet capable of yielding the usual range of feed rates and a rapid traverse rate of conventional machines.

Another object of this invention is to provide a simple and inexpensive valve mechanism for automatically yielding various cycles of operation.

A further object of this invention is to provide an improved transmission and control mechanism for a milling machine, partly electric, partly mechanical, and partly hydraulic, including suitable interlocks whereby complete control may be had over the feeding and guiding movements between a cutter and work piece and the determination of cutter rotation in accordance with the rate of the prevailing movement of the table.

Another object of this invention is to provide a transmission and control mechanism which is capable of yielding, not only a plurality of feed rates, but also a plurality of rapid traverse rates.

Other objects and advantages of the present invention should be readily apparent by reference to the following specification, considered in conjunction with the accompanying drawings forming a part thereof and it is to be understood that any modifications may be made in the exact structural details there shown, and described, within the scope of the appended claims, without departing from—or exceeding the spirit of the invention.

In the drawings in which like reference numerals indicate like or similar parts:

Figure 2 is an elevation of the machine shown in Figure 1, but viewed through the opposite side thereof.

Figure 3 is a front elevational view of the machine shown in Figures 1 and 2.

Figure 4 is a detail section on the line 4—4 of Figure 3.

Figure 5 is a detail section on the line 5—5 of Figure 4.

Figure 6 is a detail section through the trip plunger as viewed on the line 6—6 of Figure 1.

Figure 7 is an enlarged detail view through the trip plunger as viewed on the line 7—7 of Figure 6.

Figure 8 is a detail view on the line 8—8 of Figure 7.

Figure 9 is a diagrammatic view of the hydraulic transmission and control mechanism, the electrical control circuit for the spindle, and the interlock between said circuits.

Figure 1:
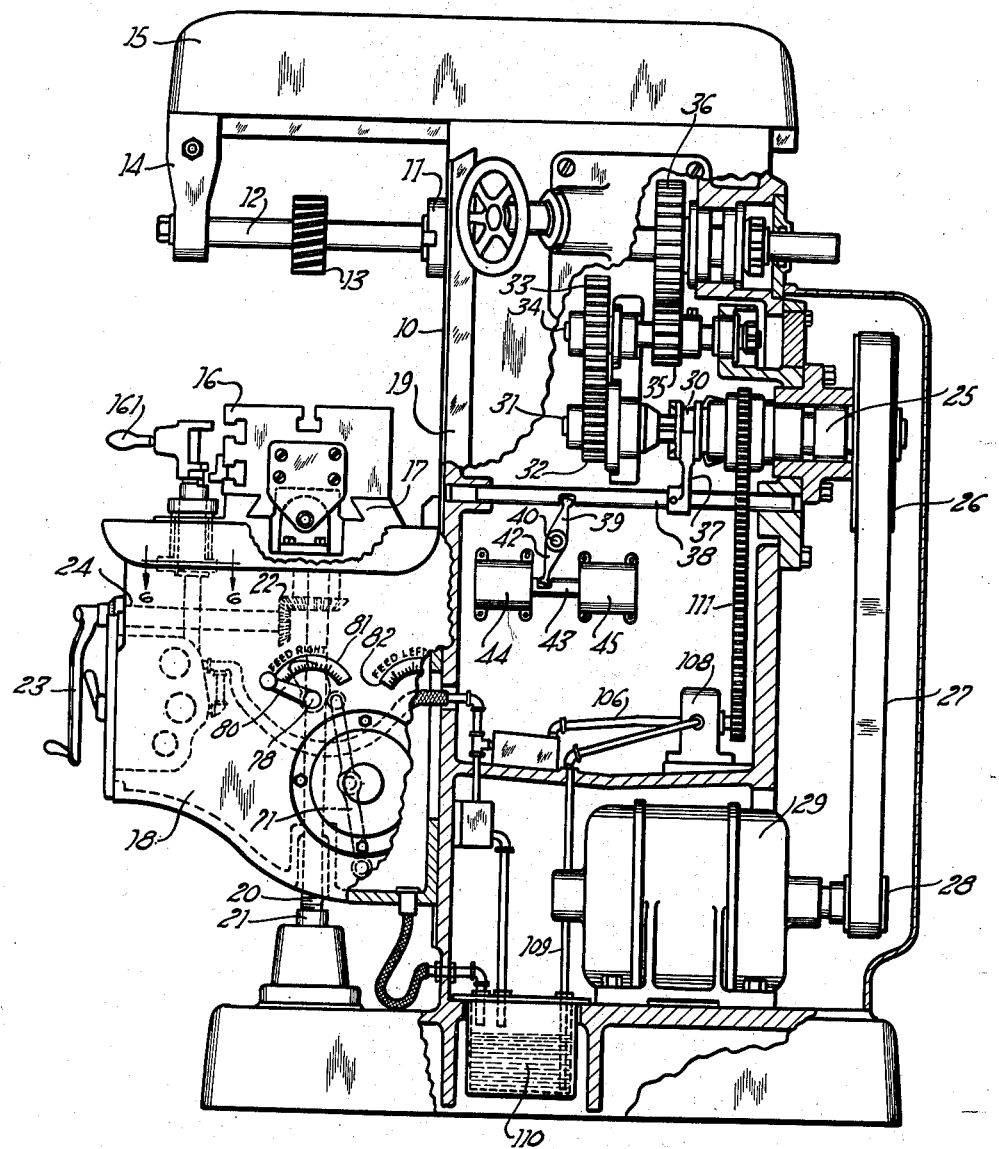
Figure 1 is a side elevation, partly in section, of a machine embodying the principles of this invention.

In the drawings the reference numeral 10 indicates the column of the machine in the upper part of which is journaled a cutter spindle 11.

A conventional arbor 12, supporting a cutter 13, may be connected to the spindle for rotation thereby and the outer end of the arbor may be supported by a pendent 14 depending from the end of an overarm 15 slidably mounted on the top of the column.

This machine has a work table 16 which is movable relative to the cutter to effect a machining operation, and this table is movable in guide ways 17 formed on the top of a knee 18 which, in turn, is guided for vertical adjustment upon guide ways 19 formed on the front face of the column. Adjustment of the knee, which is utilized to vary the depth of cut, may be effected by rotating an elevating screw 20, which is threaded in a nut 21 fixed with the column of the machine, by means of a pair of bevel gears 22, and an operating handle 23 secured to the end of shaft 24 which carries one of the bevel gears.

The transmission for the cutter spindle is shown more particularly in Figure 1 and comprises a main drive shaft 25 which is operatively connected by means of a pulley 26 and belt 27 to the pulley 28 of prime mover 29. The shaft 25 is continuously rotated by the prime mover and is adapted to be connected by the shiftable clutch member 30 to shaft 31 which has a spur gear 32 secured thereto. This gear intermeshes with a gear 33 keyed to the parallel shaft 34. The gears 32 and 33 are rate change gears and are removable for substitution of other gear pairs for varying the rate of spindle rotation.

The shaft 34 has a pinion 35 intermeshing with a large gear 36 secured in driving relation to the spindle 11.

The clutch 30 has a shifter fork 37 secured to the shifter rod 38 which is adapted to be moved back and forth by the ball-ended lever 39 secured to the oscillatable shaft 40. This shaft, as shown in Figure 2, projects beyond the side of the machine where it is provided with a manually operable handle 41.

The shaft 40 may also be oscillated by power through a second ball-ended lever 42 which interengages a pole piece 43 slidably mounted in solenoids 44 and 45. The solenoids may be alternately energized to effect shifting of the clutch into and out of a power transmitting position.

The table 16 is adapted to be moved by a piston having a piston rod 47 extending from opposite sides thereof and operatively connected to the ends of the table. The piston is slidably mounted in a cylinder 48 having ports 49 and 50 at opposite ends respectively, which are connected by channels 51 and 52 to ports 53 and 54 of a stop valve 55. The stop valve has a second pair of ports 56 and 57 to which are connected a pair of channels 58 and 59. The channels 58 may be alternately supplied with pressure fluid. The stop valve has a reciprocable spindle 60 in which is formed a pair of cannelures 61 and 62 which are adapted when the stop valve is in a running position to connect port 56 with port 53 and port 57 with port 54. When the valve is shifted to the left, as viewed in Figure 9, to a stop position the cannelure 62 interconnects ports 56 and 57 and the spools 63 and 64 are in a position to close ports 53 and 54 so that no fluid will escape from opposite ends of the cylinder.

Means have been provided for supplying fluid under pressure to channels 58 or 59 to effect reverse movement of the table 16 and comprises a reversible variable delivery pump 65 having a pair of ports 66 and 67 which are connected by branches 68 and 69 to channels 58 and 59 respectively. The pump has an adjustable pintle 70 which is movable to one side of a concentric position for causing a variable delivery flow into channel 68 and to the other side of said position for creating a variable delivery flow into channel 69. Thus the ports 66 and 67 of the pump serve alternately as intake and delivery ports, depending upon the eccentric position of the pintle 70.

The pintle may be adjusted by a pendulum 71, pivotally mounted at 72, which is fixed and operatively connected to the pintle. The arm 71 is elongated and extends between the ends of a pair of plungers 73 and 74 which may be alternately subjected to pressure to shift said pendulum and thereby the pintle in one direction or the other to change the rate and direction of table movement. A roller 75 is pivotally mounted in the end of the pendulum and a pair of adjustable cams 76 and 77 are provided to serve as abutments to limit the stroke of the pendulum in one direction or the other, whereby variable feed rates may be obtained.

The cams 76 and 77 may be secured to shafts 78 and 79 respectively, which project through the side wall of the knee as shown in Figure 1 and is provided with an operating handle, such as 80, as shown in Figure 1, and suitably graduated scales 81 and 82 may be provided to indicate the feed rate obtainable for each position of adjustment of the cams in the respective directions.

The pump 65 may be termed the feed pump and is utilized alone for producing feeding movements of the table.

When a quick traverse movement of the table is desired the volume of the flow to the table must be increased and to this end a second pump 83 is provided having a pair of ports 84 and 85, which are connected respectively by branches 86 and 87, to channels 59 and 58 respectively. This pump is likewise a reversible variable delivery pump whereby the ports 84 and 85 alternately become pressure ports, depending upon the adjustment of the pump pintle 88. This pintle is connected to a swinging pendulum 89, the end of which is interposed between a pair of sleeves 90 and 91 surrounding pistons 92 and 93 respectively. The sleeves have shoulders 94 and 95 respectively which engage one end of cylinders 96 and 97 and thereby limit their movement.

When the cylinders 96 and 97 are both subjected to pressure the sleeves 90 and 91 move outwardly to the position shown in Figure 9 and centralize the pintle 88. When, however, only one cylinder is subjected to pressure the piston inside of the sleeve is capable of further movement and is adapted to shift the pendulum 89 either to the right or left of its central position to thereby cause the pump 83 to deliver a maximum output into either channel 58 or 59 depending upon the direction of table movement desired.

From the foregoing it will be seen that the feed pump has no central position and that the rapid traverse pump does have a central position, with the result that during feeding movements of the table the rapid traverse pump is ineffective, while during rapid traverse movements the delivery of the rapid traverse pump supplements the delivery of the feed pump to thereby increase the rate of movement of the table.

By having the two cams 76 and 77 adjustable to limit the movement of pendulum 71 it is possible to restrict the movement of the pendulum 71 in one direction to a slow feed rate during advancing movement of the table, but still permit the pendulum 71 to swing to its fullest extent in the opposite direction to yield a maximum delivery of the pump 65 to supplement the maximum delivery of pump 83 whereby a return movement at a maximum rate becomes obtainable.

Attention is invited to the fact that in spite of the settings and adjustments of the two pumps it is always possible to stop the table at any time and without abnormally increasing the pressure in the prevailing supply channel.

Since the circuit between the two pumps 65, 83 and the table cylinder 48 is a practically closed circuit, and since leakage of an operating fluid under high pressure is inevitable, means have been provided for compensating for this leakage by providing a pair of inwardly opening check valves 98 and 99 which are connected by channels 100 and 101 to ports 102 and 103 of the direction control valve 104. This valve has a pressure port 105 which is connected by channel 106 to the pressure port 107 of a constant delivery pump 108. This pump has an intake 109 through which fluid is withdrawn from a main supply reservoir 110.

The pump 108, as shown in Figure 1, is driven by a chain or other power transmitting band 111 from the shaft 25, which is, as previously stated, continuously actuated by the prime mover 29. The channel 106 may have a filter 112 serially connected in the line and may also be provided with an emergency check valve 113 as more particularly shown in Figure 9.

The valve plunger 114 of the reversing valve has cannelures 115 and 116 formed therein on opposite sides of a spool 117 whereby when the valve is shifted to the right, as shown in Figure 9, the port 105 is connected to port 103 and pressure is delivered to the check valve 99, and since the system is arranged whereby at this time the channel 69 is a return channel, and therefore a low pressure channel it is possible to insert oil past the check valve 99 into channel 69 to compensate for leakage.

When the plunger 114 is shifted to the left the reverse takes place and port 105 is connected to port 102 by cannelure 116 and pressure fluid is delivered to check valve 98 and thereby into channel 68, which at this time, is a return channel. Thus the reversing valve automatically determines the side of the line into which leakage compensating fluid is to be delivered, and since the arrangement is such that it is automatically delivered into the low pressure side of the system it eliminates maintaining a high pressure in the channel 106. The channel 100 has a branch 118 connected to cylinder 119 which contains piston 74 and the channel 101 has a branch 120 connected to cylinder 121, which contains piston 73 whereby these pistons are alternately shifted to change the direction of delivery of the feed pump and thereby the direction of table movement. Thus the valve plunger 114, not only serves to change the direction of movement of the table, but also to control automatically the delivery of the fluid into the low pressure side of the circuit.

Attention is also invited to the fact that the spool 117 is larger in diameter than the adjacent spools 122 and 123 whereby after the plunger 114 is shifted past a central position the differential area between the spool 117 and the adjacent spools 122 and 123 will cause a resultant reaction, tending to complete the shifting movement of the plunger whereby the valve is energized to complete its movement which eliminates the necessity for mechanical detent mechanism.

When the port 103 is connected to the pressure port 105 the port 102 is connected to exhaust port 124, and likewise when port 102 is connected to pressure port 105 the port 103 is connected to the exhaust port 125.

The reversing valve 104 is also used to determine the direction of delivery of the rapid traverse pump, and may therefore be said to determine the direction of the rapid traverse movement. To this end the valve 104 is provided with another pressure port 126 which is alternately connectible by cannelures 127 and 128 formed in plunger 114 to ports 129 and 130, to which are connected channels 131 and 132 respectively leading to the rapid traverse control valve 133. This valve has ports 134 and 135 to which the channels 131 and 132 are connected. Therefore, depending upon the position of plunger 114 the ports 134 and 135 are alternately pressure and exhaust ports. The reason for this is that when port 129 is connected to pressure port 126 the port 130 is connected to the exhaust port 136, and when the port 130 is connected to the pressure port 126 the port 129 is connected to the exhaust port 137.

The rapid traverse valve 133 has a shiftable plunger 138 on which is formed a pair of cannelures 139 and 140, and a pair of spools 141 and 142. The spools 141 and 142 serve to close ports 134 and 135 when the plunger 138 is in a feed position, such as that shown in Figure 9. The cannelures 139 and 140 serve at this time to connect ports 143 and 144 to the pressure ports 145 and 146. Since channels 147 and 148, which are connected to cylinders 96 and 97, terminate in ports 143 and 144, it will be apparent that in the feed position of plunger 138 pressure is delivered to both cylinders 96 and 97 and the pendulum 89 of the rapid traverse pump is in a centralized position.

When, however, plunger 138 is shifted to the right of the position shown in Figure 9, port 143 is connected to port 134 and port 144 is connected to port 135, whereby if port 134 is under pressure, as determined by the reversing valve 104, the pendulum 89 will be shifted to the right, and if port 135 is under pressure, pendulum 89 will be shifted to the left of its central position.

Regardless of which side of the center the pendulum 89 is shifted during the rapid traverse movement it will be apparent that when the plunger 138 is returned to a feed position that the flow of pressure in both channels 147 and 148 will return the pendulum 89 to a central position so that only the feed pump will be delivering fluid to the table cylinder. It will thus be seen that the plunger 114 is a direction determinator regardless of the rate of movement of the table and that the plunger 138 is a rate determinator regardless of the direction of movement of the table, that is, so far as the selection between feed rate and rapid traverse rate is concerned.

The positions of plungers 138 and 114 are determined from a single rate and direction control plunger 149.

As shown in Figure 8 the plunger 138 is operatively connected by a bell crank 150 to plunger 149 whereby axial movement of the latter will effect a reciprocatory movement of the rate control plunger 138. The plunger 114 of the direction determining valve is operatively connected by a tongue and groove connection 151 to plunger 149 whereby a rotative movement of the latter will effect shifting of plunger 114. Thus, rotative movement of plunger 149 will determine the direction of slide movement and axial movement will effect selection between feed and rapid traverse rates.

As shown in Figure 7, the plunger 149 has a flange 152 against which a spring 153 bears to take the weight of plunger 149 and thereby relieve the vertical detenting mechanism comprising a pair of spring pressed balls 154 which cooperate with a pair of notches 155 and 156 formed in the periphery of the plunger.

The spring pressed balls are carried in a sleeve 157 which surrounds the plunger 149, but has a sliding spline fit therewith whereby rotative movement of the plunger will rotate the sleeve 157 but the plunger 149 is free to move axially relative to the sleeve 157. The sleeve is, therefore, mounted in the frame of the machine and held against axial movement, but is free to rotate with the plunger. Since the sleeve rotates with the plunger the detent mechanism, which holds the plunger in its different rotative positions, is applied to the exterior of the sleeve and, as more particularly shown in Figure 6, the flanged portion on the lower end of the sleeve is provided with a pair of indents 158 and 159 which cooperate with a spring pressed detent 160. Thus the plunger 149 is detented for both axial and rotative movement.

The plunger 149 may be moved manually as by the handle 161 integral therewith, or it may be moved by trip dogs carried by the table comprising reversing dogs 162 having portions 163 adapted to engage a wing 164 projecting from one side of plunger 149, and rate changing dogs 165 and 166 having portions 167 and 168 respectively for shifting the plunger axially. As shown in Figure 7, the portion 167 is adapted to cooperate with a lug 169 for depressing the plunger when the table is traveling in one direction as toward the right, as viewed in Figure 3, and a dog similar to 166 may be mounted in the upper T slot 170, whereby the operating portion 168 may be utilized to engage the under side of lug 169 to elevate the plunger.

When the table is traveling in an opposite direction a pair of dogs similar to 165 and 166 may be mounted in the lower T slot 171 for engaging opposite sides of a lug 172 projecting from plunger 149 for elevating or lowering the same during movement of the table in an opposite direction. By having two T slots in the table and two lugs 169 and 172 on the plunger it is possible to set the rate determining dogs in one T slot for determining the changes of rate during one direction of movement of the table and still not have these dogs interfere with the rate of movement of the table in an opposite direction.

As previously stated, the rate and direction plungers 138 and 114 each have only two positions and therefore the stop valve is provided for stopping and starting the table. The plunger 60 of the stop valve, as shown in Figure 5, has a slot 173 having a lost motion connection with a lug 174 integral with shaft 175 to which is attached the manually operable handle 176, as more particularly shown in Figure 4. To start the machine the operator rotates the shaft 175 in a counterclockwise direction, as viewed in Figure 5, which shifts the plunger 60 to the position shown in Figure 9. At the same time a lug 177, which rides in a bifurcation 178 formed in the end of a lever 179, permits this lever to rotate in a clockwise direction under the action of a spring 180, which is interposed between a fixed portion 181 and a collar 182 pinned to the vertically reciprocable stop plunger 183. The plunger 183 has a collar 184 near the lower end thereof for limiting upward movement effected by spring 180. The plunger also has an annular groove 185 in which fits a pin 186 integral with one end of the lever 179 whereby the spring 180 tends to constantly urge the lever in a clockwise direction. Thus, when the operator through the handle 176 shifts the stop plunger 62 to the right, as viewed in Figure 5, the spring 180 will rotate the lever 179 and move a finger 187 integral therewith into engagement with the end of plunger 160 to hold the same in operating position.

The plunger 183 may be automatically depressed by a dog 188 carried in one of the T slots of the table and upon depression of plunger 183 the finger 187 will be withdrawn from the end of plunger 60, thereby permitting a spring 189 to shift the plunger 60 to a stop position. This movement will be limited by engagement of the lug 177 with the end of lever 179. Since the ball-ended lever 174 has a lost motion connection with the slot 173 it is possible for the operator to again shift the stop plunger to a running position while the plunger 183 is held in a depressed position by the stop dog 188.

There has thus been provided means for manually and automatically stopping the table and means for manually starting the table in spite of the fact that the stop dog is still in engagement with the stop plunger.

An improved feed and rapid traverse transmission and control mechanism therefor has been provided for the table, as well as power means for shifting the start and stop clutch for the cutter spindle. It is desirable, however, that the cutter spindle only rotate during feeding movements of the table and to this end an intermediate interlocking means has been provided, comprising an electrical circuit for controlling energization of solenoids 44 and 45, and switching means controlled by the rate determinator whereby the clutch is automatically engaged when the rate determinator dictates a feeding movement and is automatically disengaged when the rate determinator dictates a rapid traverse movement.

To this end, and as more particularly shown in Figure 9, the two solenoids 44 and 45 have one end connected to a common lead 190 terminating in an off and on switch 191. This switch is connected to a power main 192.

The other power main 193 has connected to it a common lead 194 for supplying current in parallel to a pair of switches 195 and 196. These switches constitute a commercial form of limit switch having operating levers 197 and 198 and is so positioned that these levers may be alternately engaged by a trip lever 199 operatively connected by a ball and socket joint 200 to the end of valve plunger 138. Since this plunger is the rate control plunger it will be apparent that when the plunger is in a feed position that the switches will establish one connection, and when the rate plunger is in a rapid traverse position it will effect another electrical connection.

The switches 195 and 196 are connected through leads 201 and 202 to the ends of solenoids 44 and 45 whereby when one switch 196 is closed, solenoid 144 will be energized, and the clutch 37 shifted to a running position; and when the switch 195 is closed simultaneously with the opening of switch 196, solenoid 45 will be energized and the clutch 37 will be opened.

Thus, although the coupling of power to the electrical circuit is determined by the off and on switch 191, the actual position of the spindle clutch is automatically determined by the position of switches 195 and 196, and these are automatically positioned by the rate control plunger 138.

When the power switch 191 is open it is still possible to operate the clutch 30 by means of the manual control lever 41 mounted on the side of the machine as shown in Figure 2.

Attention is invited to the fact that the pumps 65 and 83 are mounted in the knee of the machine and supported in opposite side walls thereof and provided with separate motors 203 and 204 for continuously actuating the same.

It should also be noted that since the feed rate in each direction of table movement may be independently determined by the cams 76 and 77, and the mere reversal of the table will effect this change in feed rate, that a new cycle of operation of the machine becomes possible in which a work piece may be moved past a unidirectionally rotating cutter and in the same direction in which the cutting teeth are traveling to effect a roughing and the work return past the cutter at a different rate, that is, either faster or slower than the initial rate and in opposition to the direction of movement of the cutting teeth to perform a finishing operation.

There has thus been provided an improved transmission and control mechanism for a machine of the character described which is comprised of a relatively few number of parts, but which is still capable of yielding a full and satisfactory range of table rates, together with proper interlocks whereby the spindle rotation may be made to conform to the rate of table movement.

I claim:

1. In a milling machine having a tool support and a work support, the combination of fluid operable means for effecting relative movement between the supports including a piston and cylinder, one of which is connected to the work support, a pair of channels leading to opposite ends of the cylinder, a first reversible variable delivery pump having a pair of ports connected to said channels, a displacement control pendulum for varying the volumetric delivery of the pump to thereby determine the feeding rate of said support, a second reversible variable delivery pump having a pair of ports connected to said pair of channels, and having a displacement control pendulum shiftable to a first position for causing maximum delivery from the pump to one of said channels, for causing rapid traverse of the support in one direction, or to a second position for causing maximum delivery from said pump into the other of said channels for causing rapid traverse movement of the support in an opposite direction, and fluid operable means for shifting each of said pendulums.

2. In a milling machine having a tool support and a work support, the combination of fluid operable means for effecting relative movement between the supports including a piston and cylinder, one of which is connected to the work support, a pair of channels leading to opposite ends of the cylinder, a first reversible variable delivery pump having a pair of ports connected to said channels, a displacement control pendulum for varying the volumetric delivery of the pump to thereby determine the feeding rate of said support, a second reversible variable delivery pump having a pair of ports connected to said pair of channels, and having a displacement control pendulum shiftable to a first position for causing maximum delivery from the pump to one of said channels, for causing rapid traverse of the support in one direction, or to a second position for causing maximum delivery from said pump into the other of said channels for causing rapid traverse movement of the support in an opposite direction, and fluid operable means for shifting each of said pendulums, said last named means including a control valve having a first portion for determining the direction of shifting of the first pendulum, and a second portion for determining the direction of shifting of the last named pendulum.

3. In a milling machine having a tool support and a work support, the combination of fluid operable means for effecting relative movement between the supports including a piston and cylinder, one of which is connected to the work support, a pair of channels leading to opposite ends of the cylinder, a first reversible variable delivery pump having a pair of ports connected to said channels, a displacement control pendulum for varying the volumetric delivery of the pump to thereby determine the feeding rate of said support, a second reversible variable delivery pump having a pair of ports connected to said pair of channels, and having a displacement control pendulum shiftable to a first position for causing maximum delivery from the pump to one of said channels, for causing rapid traverse of the support in one direction, or to a second position for causing maximum delivery from said pump into the other of said channels for causing rapid traverse movement of the support in an opposite direction, fluid operable means for shifting each of said pendulums, said last named means including a control valve having a first portion for determining the direction of shifting of the first pendulum, and a second portion for determining the direction of shifting of the last named pendulum, and means trip operable by the work support and operatively connected for shifting said control valve.

4. In a milling machine having a cutter spindle and a work support movable transversely of said spindle, the combination of means for effecting feeding and quick traverse movements of the support in opposite directions including a piston and cylinder, one of which is operatively connected to the work support, a pair of channels leading to opposite ends of the cylinder, a pair of pumps connected in parallel to said channels, each pump having a displacement control pendulum, fluid operable means for shifting said pendulums to maximum displacement position, additional fluid operable means for shifting one of said pendulums to zero displacement, prepositionable means for variably limiting the shifting of the other displacement control pendulum while the first pendulum is in a zero displacement position to predetermine the rate of feeding movement of the work support.

5. In a milling machine having a tool spindle and a work support, the combination of means for effecting relative movement therebetween including a fluid operable motor, a pair of channels leading to the motor, a feed pump and rapid traverse pump connected in parallel to said channels, each of said pumps having a displacement control pendulum, separate fluid operable means for shifting each pendulum, a first control valve, means connecting said fluid operable means in parallel to the valve whereby both pendulums may be simultaneously shifted to change the direction of relative movement between the cutter spindle and the work support, and means interposed between said control valve and one of said fluid shifting means for disconnecting the same from the influence of said valve.

6. In a milling machine having a tool spindle and a work support, the combination of means for moving said work support transversely of the spindle in opposite directions, including a fluid operable motor connected to said work support, a pair of channels for alternately delivering fluid pressure to said motor to effect reversible operation thereof, a feed pump and a rapid traverse pump connected in parallel to said channels, each of said pumps having a displacement control pendulum and movable to opposite sides of a central position for changing the direction of output flow of the respective pumps, separate fluid operable means for shifting said pendulums, a first control valve, a source of fluid pressure connected thereto, means governed by the valve for determining the direction of shifting of said pendulums, and thereby the direction of support movement, a second control valve having a source of pressure connected thereto, means governed by the valve for disconnecting the rapid traverse pump pendulum from control of the first-named valve and shifting said pendulum to a neutral position, and a control mechanism operatively connected to both of said valves for independently shifting the same.

7. In a milling machine having a rotatable cutter spindle and a work support, the combination of transmission means for actuating said parts including a prime mover, a variable speed transmission for rotating the spindle, a clutch for coupling said transmission to the prime mover, electrically operable means for shifting said clutch, fluid operable means for shifting said work support including reversible variable displacement pumps, fluid operable means for changing the rate and direction of flow from said pumps including a direction control valve and a feed-rapid traverse selector valve, and means operable by the last named valve for determining energization of said electrical means.

8. In a milling machine having a rotatable cutter spindle and a work support, the combination of transmission means for actuating said parts including a prime mover, a variable speed transmission for rotating the spindle, a clutch for coupling said transmission to the prime mover, electrically operable means for shifting said clutch, fluid operable means for shifting said work support including reversible variable displacement pumps, fluid operable means for changing the rate and direction of flow from said pumps, including a direction control valve and a feed-rapid traverse selector valve, means operable by the last named valve for determining energization of said electrical means, means to disconnect said electrically operated means from control of the selector valve, and manually operable means for shifting said clutch during de-energization of said electrically operable means.

9. In a milling machine having a column, a cutter spindle journaled in the column, a knee carried by the column, a work table supported by the knee for reciprocation transversely of the cutter spindle, the combination of a piston and cylinder for traversing said table, a pair of pumps mounted in the knee and connected in parallel to said cylinder, each of said pumps being of the reversible variable displacement type, separate prime movers for actuating said pumps, prepositionable means carried by the knee for predetermining the displacement of one of said pumps and thereby the feed rate of said table, fluid operable means for effecting said displacement, and additional fluid operable means for effecting maximum displacement of the other pump to effect a rapid traverse movement of the table.

10. In a milling machine having a column, a cutter spindle journaled in the column, a knee carried by the column for movement toward and from the cutter spindle, a work table reciprocably mounted on the knee, the combination of transmission means for rotating the spindle and reciprocating the table including a variable speed transmission mounted in the column for rotating said spindle, a fluid operable motor for reciprocating the table, a feed pump carried by the knee, fluid connections between the pump and motor, said pump having a displacement control lever shiftable to opposite sides of a neutral position for changing the direction of the output flow from said pump, and means to limit the movement of said displacement control lever in opposite directions to thereby determine the feed rate in each direction of the table, said means including separate feed rate control levers and dial means associated with each lever to indicate the feed rate setting thereof.

11. In a milling machine having a tool spindle and a work support, the combination of transmission means for effecting said movement including a piston and cylinder, one of which is connected to the support, a reversible variable delivery pump having a pair of ports connected to opposite ends of the cylinder, a pendulum for changing the displacement of said pump and for changing the direction of flow through the pump whereby said ports will alternately be intake and delivery ports, fluid operable means for shifting said pendulum including a first channel subjectable to pressure to cause pump delivery through one of said ports, a second channel subjectable to pressure to cause pump delivery through the other of said ports, and means also connecting said channels to the respective ports including check valves whereby make-up fluid will always be delivered to the prevailing intake side of said pump.

12. In a milling machine having a tool spindle and a work support, the combination of transmission means for effecting said movement, including a piston and cylinder, one of which is connected to the support, a reversible variable delivery pump having a pair of ports connected to opposite ends of the cylinder, means for changing the direction of fluid flow through the pump whereby said ports will be alternately under high and low pressure, fluid operable means for shifting said flow reversing means including a pair of channels, a pump for delivering fluid to said channels, and means to utilize said channels for supplying make-up fluid to the prevailing intake port of said pump regardless of the direction of flow therethrough, including valve means automatically actuable to connect the channel having the higher pressure to the pump port having the lower pressure.

13. In a milling machine having a tool spindle, and a work support, the combination of means for effecting relative movement therebetween including a fluid operable motor, a pair of channels leading to the motor, a feed pump and a rapid traverse pump connected in parallel to said channels, each of said pumps having a displacement control pendulum, separate fluid operable means for positioning each pendulum, a first control valve operatively connected to said fluid operable means for controlling simultaneous actuation thereof, means interposed between said control valve and one of said fluid operable means for disconnecting same from the influence of said valve, and a stop valve interposed in said parallel channels for short circuiting one or both pumps with respect to said motor, and thereby cause the work support to come to rest.

14. In a milling machine having a tool spindle, and a work support, the combination of means for effecting relative movement therebetween including a fluid operable motor, a pair of channels leading to the motor, a feed pump and a rapid traverse pump connected in parallel to said channels, each of said pumps having a displacement control pendulum, separate fluid operable means for positioning each pendulum, a first control valve operatively connected to said fluid operable means for controlling simultaneous actuation thereof, means interposed between said control valve and one of said fluid operable means for disconnecting same from the influence of said valve, a stop valve interposed in said parallel channels for short circuiting one or both pumps with respect to said motor, and thereby cause the work support to come to rest, means trip operable by the work support for shifting said stop valve to a work support arresting position, and manually operable means for shifting said stop valve to a running position.

15. In a milling machine having a tool spindle and a work support, the combination of transmission means for actuating said parts including a prime mover, a variable speed transmission connected to the spindle, a clutch for coupling the transmission to the prime mover, electrically operated means for shifting said clutch, hydraulically operated means for actuating the work support including a direction control valve and a feed rapid traverse selector valve, and a single manual control lever operatively connected for controlling the position of said control valves and the operation of said electrical means for shifting said clutch.

16. In a milling machine having a tool spindle, the combination of power operable transmission means for rotating said spindle constantly in a predetermined direction, a milling cutter attached to said spindle, a work support for advancing a work piece past said cutter in the same direction as the proximate portion of the cutter moves and retracting the work in a direction opposite to that in which the proximate portion of the cutter moves, transmission means for feeding the table including a control member shiftable to one side of a central position for effecting a first feed rate during the advancing movement and to the other side of a central position for effecting a second feed rate during the retracting movement, and means trip actuable by the table and operatively connected for automatically shifting said control member from one position to the other whereby a hook-in roughing cut may be taken on a work piece at one rate during one pass by the cutter, and a normal or finishing cut may be taken at a different rate during a second pass of the work by the cutter.

17. In a milling machine having a tool support and a work support, the combination of means for effecting relative movement between the supports including a fluid operable motor connected to the movable support, a pair of channels leading from said motor, a pair of reversible variable delivery pumps connected in parallel to said channels, said pumps having displacement control pendulums movable from one side to the other of a central position for reversing the direction of delivery of said pumps, separate fluid operable means for shifting each of said pendulums from either of said positions to the other thereof, and a common reversing control valve for said fluid operable means.

18. In a milling machine having a tool support and a work support, the combination of means for effecting relative movement between the supports including a fluid operable motor connected to the movable support, a pair of channels leading from said motor, a pair of reversible variable delivery pumps connected in parallel to said channels, said pumps having displacement control pendulums movable from one side to the other of a central position for reversing the direction of delivery of said pumps, separate fluid operable means for shifting each of said pendulums from either of said positions to the other thereof, a common reversing control valve for said fluid operable means, and means to disconnect one of said fluid operable means from the control of said reversing valve whereby one pump may be utilized for determining slow rates of relative movement between the supports or the delivery of said pumps may be combined to determine a fast rate of relative movement between the supports.

19. In a milling machine having a work support and a tool support, the combination of means for effecting relative movement therebetween including a fluid operable motor having a pair of channels leading therefrom, a pair of reversible variable delivery pumps connected to said channels and having displacement control pendulums, a first fluid operable means for shifting one of said pendulums from one side of a central position to the other side thereof to reverse the flow of said pump, and a second fluid operable means for shifting said pendulum to a central position for stopping the delivery from said pump, additional fluid operable means for shifting the other pendulum from one side of a central position to the other thereof, a first control valve for governing actuation of said first and third named fluid operable means, and a second control valve for governing actuation of said second named fluid operable means.

LESTER F. NENNINGER.